UNITED STATES PATENT OFFICE.

ERNST OESER, OF BERLIN, GERMANY.

PROCESS OF MANUFACTURING COLORED OR SIMILAR FILMS.

SPECIFICATION forming part of Letters Patent No. 660,024, dated October 16, 1900.

Application filed December 20, 1899. Serial No. 741,058. (No specimens.)

*To all whom it may concern:*

Be it known that I, ERNST OESER, manufacturer, a subject of the King of Prussia, German Emperor, residing at Dresdenerstrasse 79, Berlin, Germany, have invented a certain new and useful Process for the Manufacture of Colored or Similar Films, of which the following is a specification.

In the manufacture of colored films, such as are used for the coloring of paper, leather, or the like and which are generally manufactured from gelatin, glycerin, and water in mixture with a dye, color, or the like coloring material of any description, a great difficulty has heretofore been experienced from the fact of the film after having been attached to the surface of the paper, leather, fabric, or the like and the excess of the material of the film having been removed readily disintegrates or crumbles, thus giving off its color, so as to soil the surrounding paper, leather, fabric, or the like material to which the film has been fixed. My invention is intended to obviate this difficulty, inasmuch as the color or bronze film manufactured by my improved process will not give off its color. It is also possible by this process to obtain shaded or differently-colored foils, such as may be used in imitation of the appearance of marble, wood, and the like.

While my process may be carried out in different ways, I prefer the following way of carrying my invention into effect: In the case of films with less expensive dyes, colors, or bronzes as a base being manufactured, I make a mixture of from five to ten grams of isinglass with ten to fifteen grams of glycerin, which I boil in one-fourth to one-half liter of water. These three ingredients being thoroughly mixed together, from four hundred to five hundred grams of zinc-white or some other white color are added, if it is desired to produce a white-colored film. For manufacturing the lighter shades of a colored film the mixture just described is mixed with the required amount of the desired color and the whole well stirred together. To the mixture of ingredients thus obtained I now add about thirty grams of albumen, the whole being kept at a moderate heat, nearly lukewarm. The use of the albumen is for the purpose of obtaining a more intimate mixture and suspension of the dye or color in the liquid and to prevent the film from giving off its color. In case of the film being attached to the paper, leather, or the like by pressing with hot presses or dies the albumen at the same time serves as a good adhesive agent and imparts luster to the surface of the material so coated. The preparation obtained by the process just described is then applied in a thin coating to a glass plate by means of a suitable brush or by any other appropriate means. As soon as the coating has become dry it is carefully scraped off or removed from the glass plate by means of a scraper or spatula, and the film thus produced is then used in the manner as metal foils—that is to say, the film is extended upon the object to which the coloring agent is to be applied by dies or presses, and the die, stencil, or the like device having its bottom surface of the pattern it is desired to produce is then applied and the colored film thereby pressed onto the base. After the excess of the material of the film has been wiped off the drying process of the paper, leather, or the like is finished.

If it is desired to manufacture colored films from deeper shades of dyes, colors, or bronzes, very little or no zinc-white at all is to be used, its quantity being replaced by the equivalent of the dye, color, or bronze in question.

For producing colored films from more expensive dyeing or coloring materials or bronzes I first make a mixture of the dye, color, or bronze with a certain quantity of albumen in solution, which is applied to the glass plate. After the coating has become dry the said coating is then covered by a second coating, consisting of a mixture of water, isinglass, glycerin, and albumen, and of a cheaper dye or color, preferably in the proportions enumerated above. After this second coating has also become dry the whole preparation is then lifted off from the glass plate in the manner described.

If it is desired to give to the film the appearance of stone or of any kind of wood or the like material, I first coat a glass plate with the color serving as the base of the pattern to be produced, which has been appropriately shaded. When this coating has become dry, or at least retains but a small amount of moisture, it is covered by a coating of the preparation described made with less expensive color. A little albumen is added to the color or dye used to produce the shading; but I may also reverse the coating process and first coat the glass plate with the above preparation serving as a base and prepared with a less expensive color, which coating is then allowed to dry and subsequently covered with the bronzing or dyeing or coloring material of higher value mixed with a proper binding material, which is shaded in the usual manner.

The process may also be used to coat metal foils with the preparation without the necessity of previously tinting the ground plate. In this case the mass is prepared from isinglass, glycerin, water, and albumen mixed with a less expensive yellow or red color, the mixture being then applied to a glass plate and allowed to become dry. It is then coated with a solution of albumen, and upon this the metal foil is laid. When the mass has become dry, the several coatings will have become united, and the whole preparation may then be pulled off from the plate. It is, however, possible to put the metal foil upon the coating consisting of my preparation after the same has become nearly solid.

What I claim, and desire to secure by Letters Patent of the United States, is—

1. The process of manufacturing films which consists in mixing isinglass with glycerin and boiling the mixture in water, adding color thereto, stirring the ingredients together, adding albumen while keeping the whole at a moderate heat, laying out the mixture and leaving it to dry.

2. The process of manufacturing films which consists in mixing from five to ten grams of isinglass with ten to fifteen grams of glycerin and boiling the mixture in a one-fourth to one-half liter of water, adding from four hundred to five hundred grams of color thereto, stirring the ingredients together, adding about thirty grams of albumen while keeping the whole at a moderate heat, laying out the mixture and leaving it to dry.

3. As a new article of manufacture, a film consisting of isinglass, glycerin, albumen and a color.

In witness whereof I have signed this specification in the presence of two witnesses.

ERNST OESER.

Witnesses:
WOLDEMAR HAUPT,
HENRY HASPER.